US008191969B2

(12) United States Patent
Demaras

(10) Patent No.: US 8,191,969 B2
(45) Date of Patent: Jun. 5, 2012

(54) HEAD RESTRAINT

(76) Inventor: Veronica Demaras, Closter, NJ (US)

(*) Notice: Subject to any disclaimer, the term of this patent is extended or adjusted under 35 U.S.C. 154(b) by 301 days.

(21) Appl. No.: 12/612,389

(22) Filed: Nov. 4, 2009

(65) Prior Publication Data

US 2011/0101761 A1    May 5, 2011

(51) Int. Cl.
*A47C 7/36* (2006.01)
(52) U.S. Cl. .............. 297/397; 297/393; 297/216.11
(58) Field of Classification Search .......... 297/393, 297/397, 398, 404, 216.11, 256.15
See application file for complete search history.

(56) References Cited

U.S. PATENT DOCUMENTS

| 3,713,695 | A  | * | 1/1973  | Von Wimmersperg | 297/488 |
| 4,607,885 | A  | * | 8/1986  | del Fierro | 297/397 |
| 5,378,042 | A  | * | 1/1995  | Daneshvar | 297/393 |
| 6,607,245 | B1 | * | 8/2003  | Scher | 297/393 |
| 6,641,221 | B1 | * | 11/2003 | Kastlunger | 297/397 |
| 7,726,735 | B2 | * | 6/2010  | Resendez | 297/228.11 |
| 7,832,802 | B2 | * | 11/2010 | Ehlers et al. | 297/393 |
| 2004/0124685 | A1 | * | 7/2004 | Buch | 297/393 |
| 2010/0009598 | A1 | * | 1/2010 | Barton et al. | 450/39 |
| 2011/0043025 | A1 | * | 2/2011 | Park | 297/393 |

* cited by examiner

*Primary Examiner* — Sarah B McPartlin
(74) *Attorney, Agent, or Firm* — Ostrolenk Faber LLP

(57) ABSTRACT

A device for use with a headrest having lateral portions extending out of a plane which the headrest predominantly occupies, and defining a longitudinal open area at one end of the headrest, has a flexible tubular body with a circumference sized to fit the around the headrest including its lateral portions. The flexible tubular body of the device further has a first open end, the first open end being sized and dimensioned to not obstruct the longitudinal open area at one end of the headrest. A mesh netting web closes the first open end of the flexible tubular body and is operative to preclude the longitudinal migration of the device in at least one direction on the headrest. A friction-enhancing pad is secured to an inward-facing surface of the tubular body. One or more positioning straps extending from the flexible tubular body may be provided.

17 Claims, 2 Drawing Sheets

HEAD RESTRAINT

BACKGROUND OF THE INVENTION

1. Field of the Invention

Figure 1:
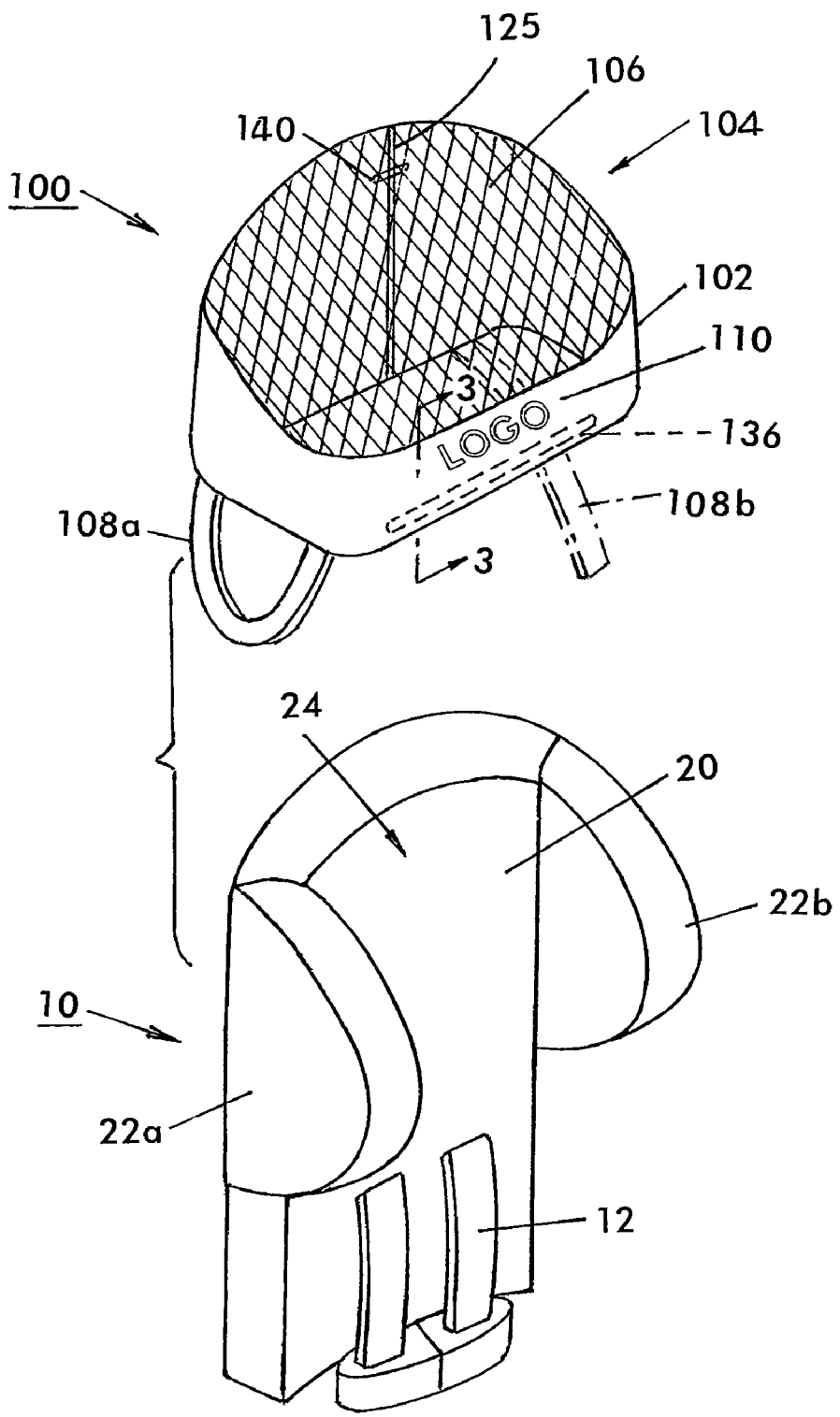

The present disclosure relates to the field of transportation seating, and more particularly to a head restraint for maintaining a comfortable head position when restrained and/or sleeping in an upright seated position.

2. Description of Related Art

Several seating devices are known to the art, e.g., 10, in which an individual is restrained in an upright seated position by at least shoulder straps 12. In particular, this arrangement is common for child safety or so-called booster seats, though that is not the exclusive use of such apparatus. Accordingly, the seated individual's head (not shown) is positioned in against a headrest 20.

Additionally, the headrest 20 is commonly provided with lateral supports 22a, 22b, that extend out of a plane in which the headrest 20 predominantly occupies. As a consequence of this arrangement, the headrest 20 together with its lateral supports 22a, 22b form a longitudinal open area 24 at one end of the headrest.

Further, because the individual is held in the upright position by straps 12 securing the torso, if that individual were to fall asleep, their head would be unrestrained. In most circumstances, the head would then fall downward without the conscious effort to maintain it erect. Sleeping in such an awkward position for an extended period of time can induce later musculo-skeletal discomfort upon waking, or even risk of airway obstruction.

SUMMARY OF THE INVENTION

In order to overcome these and other deficiencies, drawbacks and shortcomings in the present state of the art, it is an object of the present disclosure to provide a device for use with a headrest having lateral portions extending out of a plane which the headrest predominantly occupies, and defining a longitudinal open area at one end of the headrest, the device comprising a flexible tubular body having a circumference sized to fit the around the headrest including its lateral portions. The flexible tubular body of the device further has a first open end, the first open end being sized and dimensioned to not obstruct the longitudinal open area at one end of the headrest. A mesh netting web closes the first open end of the flexible tubular body and is operative to preclude the longitudinal migration of the device in at least one direction on the headrest. A friction-enhancing pad is secured to an inward-facing surface of the tubular body. One or more positioning straps extending from the flexible tubular body may be provided.

In a further embodiment of the device, the friction enhancing pad comprises a silicone material, and the friction enhancing pad is secured to the flexible tubular body by at least one of stitching, adhesive, and embedding into the flexible tubular body. The friction enhancing pad is positioned at least partially between the lateral portions of the headrest.

The flexible tubular body may comprise a textile material, and/or an elastic material. Further, the circumference of the flexible tubular body may be made adjustable, whether by the inclusion of elastic material, or by the provision of a discontinuity along its circumference, the discontinuity being closeable at a plurality of positions to selectively reduce the circumference thereof. A closure may be provided, positioned an operable to alter the circumference of the flexible tubular body. The closure may comprise one or more of hook-and-loop material (e.g., VELCRO), snaps, button-and-hole, hook-and-eye, zipper and drawstring.

Optionally or additionally, an outward-facing surface of the tubular body may be provided with decorative indicia.

In a further embodiment of the present disclosure, the flexible tubular body includes a strengthening panel within to reinforce at least a portion of the flexible tubular body, and further may be made more resilient to elongation than the material of the flexible tubular body. The strengthening panel may be enclosed within the flexible tubular body, and may be secured to the flexible tubular body by at least one of stitching, adhesive, and embedding into the flexible tubular body. The strengthening panel may be positioned at least partially between the lateral portions of the headrest.

BRIEF DESCRIPTION OF THE DRAWING(S)

Figure 2:
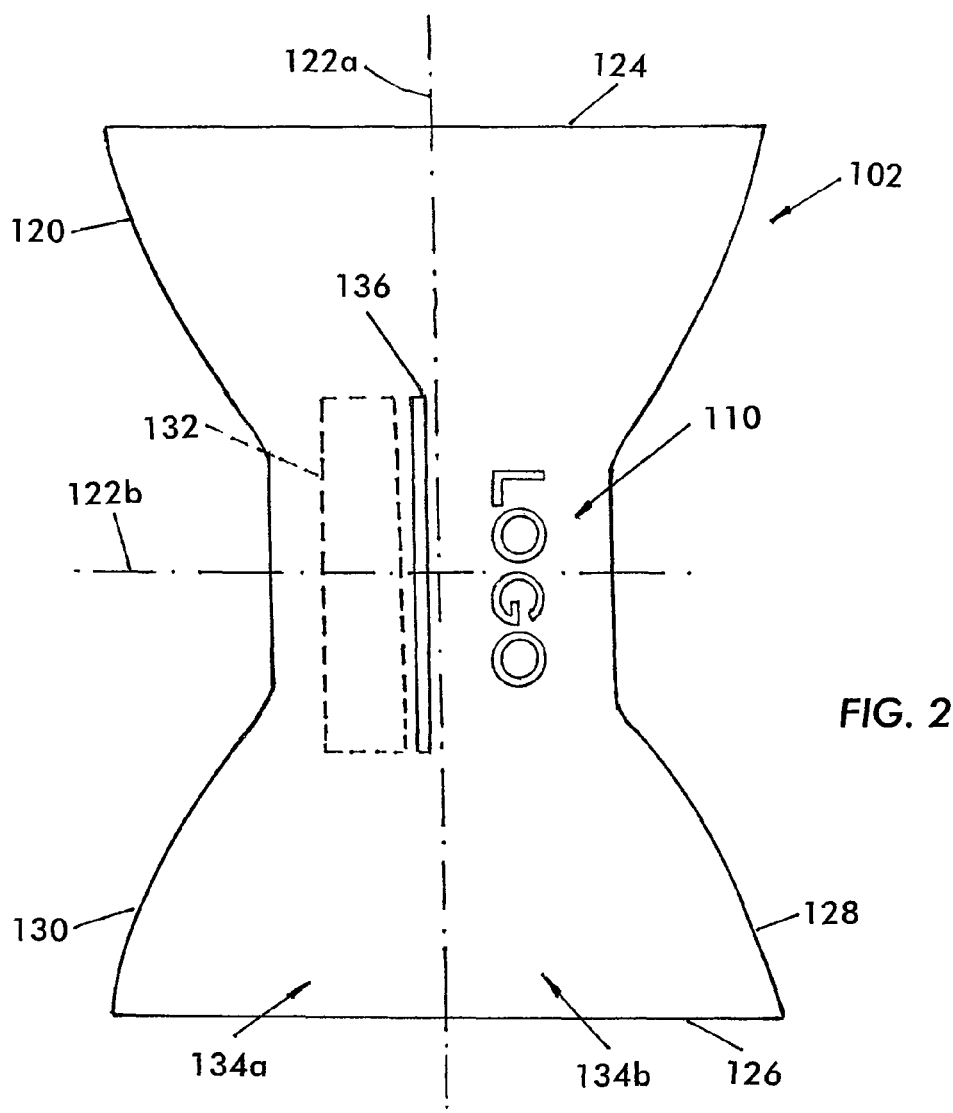
Figure 3:
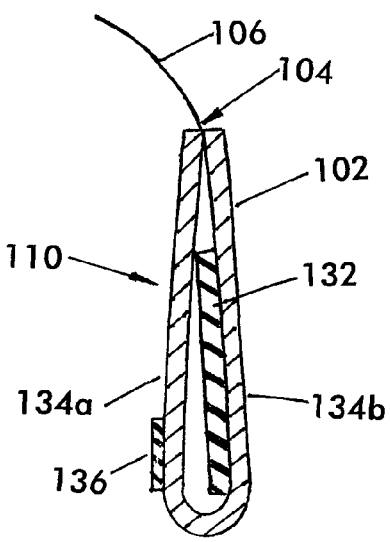

These and other features, advantages and benefits of the present disclosure will become apparent from the following description of the disclosure, which refers to the accompanying drawings wherein like reference numerals refer to like structures across the several views, and wherein FIG. 1 illustrates an exploded assembly view of a head restraint according to the instant disclosure and a headrest upon which it may be installed;

FIG. 2 illustrates an unconstructed tubular body of a head restraint, according to a particular embodiment of the instant disclosure; and FIG. 3 illustrates a cross-sectional view taken along section line 3-3 for FIG. 1.

DETAILED DESCRIPTION OF EMBODIMENTS OF THE INVENTION

Referring now to FIG. 1, illustrated is an exploded assembly view of a head restraint, generally 100, according to the instant disclosure and of a headrest 20 of a seat 10 upon which the head restraint 100 may be installed. The head restraint 100 has a flexible tubular body 102, having a circumference tailored to fit securely around the headrest 20 and its lateral portions 22a, 22b. In certain embodiments the circumference of the tubular body 102 may be adjustable. The tubular body 102 may have an adjustable circumference by the nature of the material from which it is formed, for example the inherent or imparted elasticity to some or all of that material. In a particular embodiment of the restraint 100, the tubular body 102 is formed of a woven textile fabric. The textile fabric has a certain degree of resilience to stretching, and as such may be considered elastic. However, other materials with higher degrees of elasticity (e.g., without limitation, NYLON, LYCRA, etc.) are also contemplated.

Alternately or additionally, the circumference of the tubular body 102 may be made adjustable by including a division therein (not shown), and providing a closure (not shown) at one or both opposing ends of such division. For example, the closure may be corresponding parts of hook-and-loop material (colloquially, VELCRO), snaps, button-and-hole, hook-and-eye, zipper, drawstring, or others such as are known to one skilled in the art. Alternately, such a closure may be provided without any division or discontinuity, yet provide similar function and effect.

The tubular body 102 has a first open end 104 corresponding in size and shape to the longitudinal open area 24 of the seat 10 and headrest 20. In particular, the tubular body 102 should not obstruct the open area 24. In use, an individual's head will be beneath the open area 24 and open end 104, and further that the individual's head is a considerable source of heat emitted by the individual. In that case, an obstruction to the open area 24 would enclose or trap such heated air, and create a discomfort to the individual.

On the other hand, the vertical position of the head restraint 100 on the headrest 20 should be maintained. Therefore, the open end 104 of the tubular body 102 is closed by a mesh netting web 106. The mesh netting web 106 may be secured around the perimeter of the open end 104, though certain gaps between the tubular body 102 and the mesh netting web 106 can be accommodated without departing from the scope of the present disclosure. The mesh netting web 106 in most instances will have space between the threads of the web that are at least as large, but preferably significantly larger, than the width of the threads themselves. In any case, it is intended that the web present no substantial impedance to the flow of air therethrough, so that the mesh netting web 106 may include fabrics considered "breathable" to those skilled in the art. The mesh netting web 106 secured to the tubular body 102 limits the downward vertical movement of the restraint 100 as installed on the headrest 20.

Optionally, the restraint 100 is provided with one or more (in the exemplary embodiment, two) straps that are secured to or integral with, and extend from, the tubular body 102. In a first embodiment, strap 108a is secured to the tubular body in at least two locations, and forms a loop or handle. In an alternate embodiment, strap 108b, illustrated in phantom line, is secured to the tubular body 102 at a single location. Straps 108a, 108b may be used in substitution for one another or in addition to one another, and placed on opposing lateral sides of tubular body 102, for example. Alternately or additionally, straps 108a, 108b may be positioned anywhere on the tubular body 102, but in particular are useful positioned on a closed face of the seat 10, i.e., the side of the headrest 20 opposite the direction in which the lateral supports 22a, 22b extend. Straps 108a, 108b are intended to assist in positioning the restraint 100 on the headrest 20, even though the user may not have ready access to the closed face, for example.

Optionally, for ornamental purposes, the band may be provided with indicia 110 on a front side thereof. Indicia 110 may include a design or pattern, a logo or the like, for example of a sporting team or player thereof, or a fictional character appealing to children whom commonly occupy such seats 10. The description or provision of indicia 110 is not to preclude that alternately or additionally the tubular body 102 and/or mesh netting web 106 may comprise ornamental features, including those described with respect of indicia 110.

Referring then to FIG. 2, a particular construction of the tubular body 102 will be described. Tubular body 102 is constructed of a textile blank 120 cut to a particular shape. The blank 120 is symmetrical with respect to both vertical axis 122a and horizontal axis 122b. The tubular body 102 may be constructed by folding the blank upon itself over vertical axis 122a. Opposing edges 128, 130 are thus brought together, and will form a circumference of the open end 104 of the tubular body 102. The edges 128, 130 are also joined together with the mesh netting web 106 (FIG. 1), to close the open end 104.

Further, opposing edges 124, 126 are likewise joined together, for example at seam 125 (FIG. 1). It will be appreciated that this construction can be altered without departing from the scope of the present disclosure, for example to relocate the position of the seam 125, while maintaining the shape of the tubular body 102 and that of the open end 104. Seam 125 may be made incomplete along a longitudinal axis of the tubular body 102, thereby providing a location of the optional division and optional closure, discussed supra. In further alternate embodiments, the tubular body may be constructed longitudinally seamless, to eliminate seam 125. In a further embodiment, the tubular body 102 may be formed from a blank of two or more pieces, and in assembling the tubular body 102 more than one such seam 125 is formed. It is contemplated that two or more such seams 125 may be formed. Where two are formed, they may, for example, be generally opposed on respective lateral sides of the tubular body 102.

The tubular body may be reinforced by strengthening panel 132, illustrated in FIG. 2 in hidden line, and positioned on an opposite side of the blank 120. Therefore, when the blank 120 is folded upon itself, the opposing halves 134a, 134b of the blank 120 enclose the strengthening panel 132. Strengthening panel 132 may comprise an elastic material, and have a greater resistance to stretch than the tubular body 102 and/or blank 120 themselves. Strengthening panel 132 can optionally be stitched to, adhered to, or embedded into blank 120 and/or tubular body 102 to maintain its position. The position of the strengthening panel 132 is preferably, but not exclusively, between the laterals supports 22a, 22b of the headrest 20 as the restraint 100 is installed on the headrest 20.

It is also considered that the head of the seated individual may exert an upward force on the restraint 100, thereby tending to dislodge it. Strengthening panel 132 may serve to resist this tendency. For example, an upward force may be applied only at a lower portion of the tubular body 102. The flexible tubular body may respond by tending to fold upon itself, thereby ride upward on the head of the seated individual, rather than repositioning of the entire tubular body 102, as would be the case were it rigid. By inhibiting the ability of the tubular body 102 to fold upon itself, strengthening panel 132 resists the tendency to dislodge the restraint 100.

Alternately or additionally, on an inward facing surface of the tubular body 102, friction enhancing pad 136 can be provided, illustrated in FIG. 2 as on one half 134a of the blank 120 to one side of vertical axis 122a. The friction enhancing pad 136 is positioned to rest on the forehead of the seated individual. As such, it is preferred that the friction enhancing pad 136 also be comfortable to the skin. A silicone material is contemplated to comprise the friction enhancing pad 136. Friction enhancing pad 134 may be stitched to, adhered to, or embedded into blank 120 and/or tubular body 102.

Alternately or additionally, friction enhancing pad 136 may also interface with the headrest 20, and particularly a backside thereof, and/or lateral supports 22a, 22b. In the case where the friction enhancing pad 134 interfaces only the headrest 20 or lateral portions 22a, 22b, the comfort of pad against the user is not a concern. Therefore, alternate materials could be used in the friction enhancing pad 136, or at least that portion thereof that does not interface the individual.

The exemplary construction of the restraint 100 is additionally illustrated with reference to cross-section of FIG. 3. Therein, it can be seen that the textile blank 120 is folded upon itself to form tubular body 102. Mesh netting web 106 is joined to the tubular body 102 at open end 104 thereof. The friction enhancing pad 136 can be seen on an inward facing side of the tubular body 102. Optional indicia 110 preferably faces outward. Strengthening panel 132 in positioned within tubular body 102 between opposing halves 134a, 134b of the textile blank 120.

In use it is contemplated that the restraint 100 may be installed on the headrest 20 with a front portion, i.e., that portion generally between lateral supports 22a, 22b, lifted when the restraint is not needed, for example when the seated individual is awake. Thereafter, the front portion could be lowered into position to maintain an upright position of the individual's head, for example after that individual falls asleep.

Many such seats 10 are provided with an upper tether strap (not shown) as part of a standardized LATCH system for securing such seats 10 into automobiles. To accommodate this feature, one or more of the flexible tubular body 102, the netting mesh web 106, and/or the joining of the two at or near the open end 104, may comprise a tether slot 140 (FIG. 1) forming a passage by which a tether strap secured to the seat 10 may be passed. Therefore, the seat 10 may be secured without regard to the presence of the restraint 100. The tether slot 140 may be formed in the tubular body as shown in FIG. 1. The tether slot 140 need not be located at or near seam 125 as shown. Tether slot 140 can be formed in and/or through the tubular body 102, or by a void in the seam 125 if located conveniently thereto. Alternately, tether slot 140 may be formed in and through the mesh netting web 106. It may be formed by a discontinuity at the intersection of the tubular body 102 and the mesh netting web 106. Alternately or additionally, passage 140 may be provided by virtue of the open space inherently extant between threads of the mesh netting web 106.

Although the present disclosure has been described in relation to particular embodiments thereof, many other variations and modifications and other uses will become apparent to those skilled in the art. It is preferred, therefore, that the present disclosure be limited not by the specific disclosure herein, but only by the appended claims.

What is claimed is:

1. A device for use with a headrest having lateral portions extending out of a plane which the headrest predominantly occupies, and defining an open area at one end of the headrest, the device comprising:
   a flexible tubular body having a perimeter and a circumference sized to fit the around the headrest including its lateral portions;
   the flexible tubular body having a first open end, the first open end being sized and dimensioned to not obstruct the open area at one end of the headrest;
   a mesh netting web secured to the flexible tubular body adjacent the perimeter and substantially closing the first open end of the flexible tubular body and operative to preclude the movement of the device in at least one direction on the headrest; and
   a strengthening panel secured to or embedded within the flexible tubular body to reinforce at least a portion of the flexible tubular body.

2. The device according to claim 1, further comprising one or more positioning straps extending from the flexible tubular body.

3. The device according to claim 1, wherein the strengthening panel is enclosed within the flexible tubular body.

4. The device according to claim 1, wherein the strengthening panel is secured to the flexible tubular body by at least one of stitching, adhesive, and embedding into the flexible tubular body.

5. The device according to claim 1, wherein the strengthening panel is positioned at least partially between the lateral portions of the headrest.

6. The device according to claim 1, wherein the strengthening panel is more resilient to elongation than the material of the flexible tubular body.

7. The device according to claim 1, wherein the flexible tubular body comprises a textile material.

8. The device according to claim 1, wherein the circumference of the flexible tubular body is adjustable.

9. The device according to claim 8, further comprising a closure positioned and operable to alter the circumference of the flexible tubular body, the closure comprising one or more of hook-and-loop material, snaps, button-and-hole, hook-and-eye, zipper and drawstring.

10. The device according to claim 1, wherein the flexible tubular body comprises an elastic material.

11. The device according to claim 1, wherein the flexible tubular body has a discontinuity along its circumference, the discontinuity being closeable at a plurality of positions to selectively reduce the circumference thereof.

12. The device according to claim 1, further comprising decorative indicia on an outward-facing surface of the tubular body.

13. The device according to claim 1, wherein the flexible tubular body includes a friction-enhancing pad secured to an inward-facing surface of the tubular body.

14. The device according to claim 13, wherein the friction enhancing pad comprises a silicone material, and the friction enhancing pad is secured to the flexible tubular body by at least one of stitching, adhesive, and embedding into the flexible tubular body.

15. The device according to claim 13, wherein the friction enhancing pad is positioned at least partially between the lateral portions of the headrest.

16. The device according to claim 1, further comprising a tether slot at one or more of the flexible tubular body, mesh netting web, and the first open end, the tether slot being sized and positioned to pass a tether strap of the headrest.

17. The device according to claim 1, wherein the flexible tubular body is formed of at least two joined sections, with seams joining the at least two joined sections being generally opposed on respective lateral sides of the flexible tubular body.

* * * * *